United States Patent
Sharp et al.

(10) Patent No.: US 8,458,581 B2
(45) Date of Patent: Jun. 4, 2013

(54) SYSTEM AND METHOD TO SERIALLY TRANSMIT VITAL DATA FROM TWO PROCESSORS

(75) Inventors: William A. Sharp, Cranberry Township, PA (US); John E. Lemonovich, South Fayette, PA (US); James C. Werner, Oakmont, PA (US); Zhu Ding, Marshall Township, PA (US); Lawrence A. Weber, Allison Park, PA (US)

(73) Assignee: Ansaldo STS USA, Inc., Pittsburgh, PA (US)

( * ) Notice: Subject to any disclaimer, the term of this patent is extended or adjusted under 35 U.S.C. 154(b) by 457 days.

(21) Appl. No.: 12/579,504

(22) Filed: Oct. 15, 2009

(65) Prior Publication Data

US 2011/0093767 A1    Apr. 21, 2011

(51) Int. Cl.
*G06F 11/00*    (2006.01)

(52) U.S. Cl.
USPC ............................................. 714/819

(58) Field of Classification Search
None
See application file for complete search history.

(56) References Cited

U.S. PATENT DOCUMENTS

| | | | |
|---|---|---|---|
| 5,301,906 A | 4/1994 | Bodnar, II | |
| 5,408,627 A | 4/1995 | Stirk et al. | |
| 6,026,464 A | 2/2000 | Cohen | |
| 6,073,251 A * | 6/2000 | Jewett et al. | 714/6.32 |
| 6,085,290 A * | 7/2000 | Smith et al. | 711/131 |
| 6,611,908 B2 | 8/2003 | Lentz et al. | |
| 6,799,252 B1 | 9/2004 | Bauman | |
| 7,206,891 B2 | 4/2007 | Emerson et al. | |
| 7,350,026 B2 | 3/2008 | Popescu et al. | |
| 7,363,436 B1 | 4/2008 | Yeh et al. | |
| 2003/0172225 A1 | 9/2003 | Brown | |
| 2005/0268050 A1 | 12/2005 | Suh | |
| 2005/0278499 A1 | 12/2005 | Durham et al. | |
| 2007/0150666 A1 | 6/2007 | Hwang et al. | |
| 2007/0208902 A1 | 9/2007 | Park et al. | |
| 2007/0245094 A1 | 10/2007 | Lee et al. | |
| 2007/0288792 A1 | 12/2007 | Thorpe et al. | |
| 2008/0263287 A1 | 10/2008 | Kim | |
| 2008/0279003 A1 | 11/2008 | Kim et al. | |

OTHER PUBLICATIONS

Sainrat, P., et al., "The Design of the M3S : a Multiported Shared-Memory Multiprocessor", IEEE, 1992, pp. 326-335.

* cited by examiner

*Primary Examiner* — Michael Maskulinski
(74) *Attorney, Agent, or Firm* — Eckert Seamans Cherin & Mellott, LLC; Kirk D. Houser

(57) ABSTRACT

A system for serially transmitting vital data includes first and second processors to determine first and second data, a serial communication apparatus to input third data and output serial data based upon the third data, and a memory having first and second ports accessible by the first and second processors, a first memory writable by the first processor and readable by the second processor, and a second memory writable by the second processor and readable by the first processor. The first and second processors store the first and second data in the first and second memories, cooperatively agree that the first data corresponds to the second data, and responsively cause the apparatus to employ: one of the first and second data as the third data, or parts of the first and second data as the third data, and output the serial data based upon the third data.

31 Claims, 5 Drawing Sheets

SYSTEM AND METHOD TO SERIALLY TRANSMIT VITAL DATA FROM TWO PROCESSORS

BACKGROUND

1. Field

The disclosed concept pertains generally to serial communication apparatus and, more particularly, to such serial communication apparatus for serially transmitting vital data. The disclosed concept also pertains to methods of serially transmitting vital data.

2. Background Information

Vital control systems using plural vital processors need a mechanism to output vital data (e.g., without limitation, a vital message including plural data bytes) for transmission over a serial communication network, channel, interface or media. Such vital processors need to be able to independently compose data content and authorize a single point of transmission of vital data (e.g., a vital message) only if all such vital processors agree on the data content.

In such a vital control system, there is the need that no one vital processor be able to serially transmit complete, valid vital data (e.g., a valid vital message).

There is also the need that if a communication protocol associated with the output vital data does not provide protection against the transmission of old or stale data (e.g., an old or stale message), that a mechanism of providing stalled data protection be provided.

There is room for improvement in serial communication apparatus for serially transmitting vital data.

There is also room for improvement in methods of serially transmitting vital data.

SUMMARY

These needs and others are met by embodiments of the disclosed concept, which provide a serial communication apparatus to input data and output serial data based upon the input data, and a multiple-ported memory comprising a first port accessible by a first processor, a second port accessible by a second processor, a first memory writable by the first processor and readable by the second processor, and a second memory writable by the second processor and readable by the first processor. The first processor stores first data in the first memory, the second processor stores second data in the second memory, and both of the first and second processors cooperatively agree that the first data in the first memory corresponds to the second data in the second memory, and responsively cause the serial communication apparatus to employ: (a) one of the first data and the second data as the input data, or (b) part of the first data and part of the second data as the input data, and to output the serial data based upon the input data.

In accordance with one aspect of the disclosed concept, a system for serially transmitting vital data comprises: a first processor structured to determine first data; a second processor structured to determine second data; a serial communication apparatus structured to input third data and output serial data based upon the third data; and a multiple-ported memory comprising a first port accessible by the first processor, a second port accessible by the second processor, a first memory writable by the first processor and readable by the second processor, and a second memory writable by the second processor and readable by the first processor, wherein the first processor is further structured to store the first data in the first memory, wherein the second processor is further structured to store the second data in the second memory, and wherein both of the first and second processors are further structured to cooperatively agree that the first data in the first memory corresponds to the second data in the second memory, and responsively cause the serial communication apparatus to employ: (a) one of the first data and the second data as the third data, or (b) part of the first data and part of the second data as the third data, and to output the serial data based upon the third data.

The first and second processors may further be structured to clear the first data in the first memory and the second data in the second memory, respectively, if the first data in the first memory does not correspond to the second data in the second memory.

Each of the first data and the second data may comprise a message portion and a CRC portion; and the serial communication apparatus may comprise a buffer structured in size to receive only one of the message portion and the CRC portion.

Both of the first and second processors may be further structured to cooperatively agree that the first data in the first memory corresponds to the second data in the second memory, and responsively cause the serial communication apparatus to output the serial data based upon the message portion; and both of the first and second processors may be further structured to cooperatively agree that the first data in the first memory corresponds to the second data in the second memory, and responsively cause the serial communication apparatus to output the serial data based upon the CRC portion.

The first and second processors may be further structured to clear the first data in the first memory and the second data in the second memory, respectively, if the CRC portion of the first data in the first memory does not correspond to the CRC portion of the second data in the second memory.

The buffer of the serial communication apparatus may be structured to input a first part of the message portion of the first data and a second part of the message portion of the second data before outputting the serial data based upon the first part and the second part, and may be further structured to input a first part of the CRC portion of the first data and a second part of the CRC portion of the second data before outputting the serial data based upon the last such first part and the last such second part.

As another aspect of the disclosed concept, a system for serially transmitting vital data comprises: a first processor structured to determine first data; a second processor structured to determine second data; a serial communication apparatus structured to input third data and output serial data based upon the third data; and a multiple-ported memory comprising a first port accessible by the first processor, a second port accessible by the second processor, a first memory writable by the first processor and readable by the second processor, and a second memory writable by the second processor and readable by the first processor, wherein the first processor is further structured to store the first data in the first memory, wherein the second processor is further structured to store the second data in the second memory, wherein both of the first and second processors are further structured to cooperatively agree that the first data in the first memory corresponds to the second data in the second memory, and responsively cause the serial communication apparatus to employ: (a) one of the first data and the second data as the third data, or (b) part of the first data and part of the second data as the third data, and to output the serial data based upon the third data, wherein each of the first processor and the second processor comprises a first task structured to determine the first data and the second data, respectively, and a second task structured to cooperate with the other one of the first processor and the second processor to cause the serial communication apparatus to input the third data and output the serial data based upon the third data.

As another aspect of the disclosed concept, a method of serially transmitting vital data comprises: determining first data with a first processor; determining second data with a second processor; inputting third data with a serial communication apparatus; outputting serial data with the serial communication apparatus based upon the third data; accessing a first port of a multiple-ported memory by the first processor; accessing a second port of the multiple-ported memory by the second processor; writing a first memory of the multiple-ported memory by the first processor; reading the first memory of the multiple-ported memory by the second processor; writing a second memory of the multiple-ported memory by the second processor; reading the second memory of the multiple-ported memory by the first processor; storing the first data in the first memory by the first processor; storing the second data in the second memory by the second processor; agreeing by both of the first and second processors that the first data in the first memory corresponds to the second data in the second memory; and responsive to the agreeing, causing the serial communication apparatus to employ: (a) one of the first data and the second data as the third data, or (b) part of the first data and part of the second data as the third data, and to output the serial data based upon the third data.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
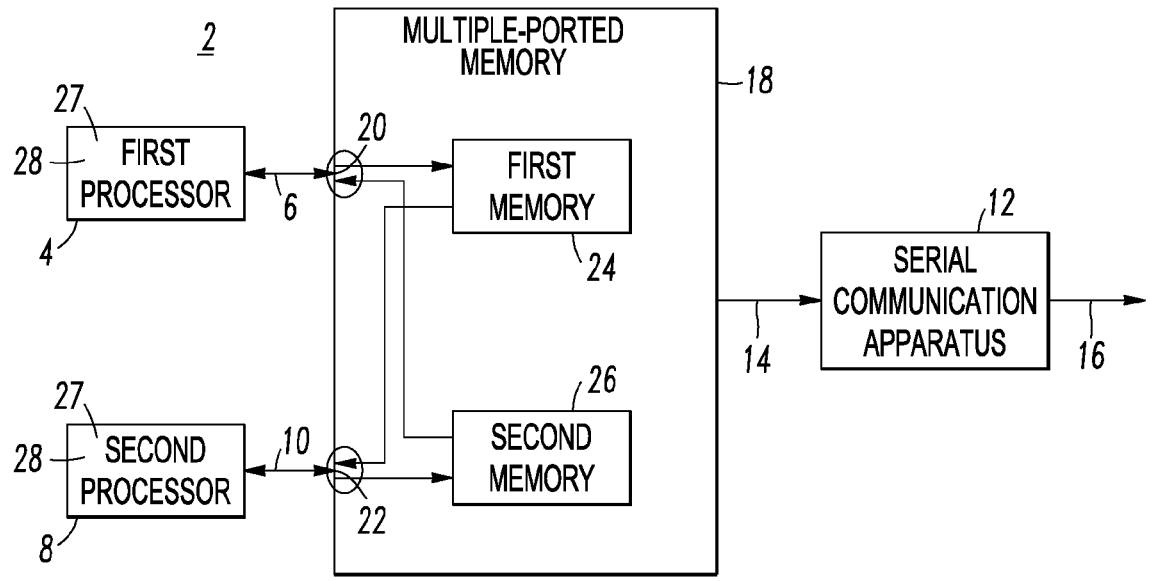
FIG. 1 is a block diagram in schematic form of a vital communication system in accordance with embodiments of the disclosed concept.

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; a field programmable gate array; or any suitable processing device or apparatus.

As employed herein, the term "field programmable gate array" or "FPGA" means a semiconductor device containing programmable logic components, such as logic blocks, and programmable interconnects therebetween. Logic blocks can be programmed to perform the function of basic logic gates (e.g., without limitation, AND; OR; XOR; NOT) or relatively more complex combinational functions (e.g., without limitation, decoders; relatively simple mathematical functions; IP cores; central processing units). The FPGA logic blocks may also include volatile and/or non-volatile memory elements. A hierarchy of programmable interconnects allows logic blocks to be interconnected and programmed after the FPGA is manufactured to implement any logical function.

As employed herein, the term "diverse" means composed of distinct or unlike elements or qualities. For example, an FPGA made by one vendor (e.g., without limitation, Altera Corporation) is diverse from a different FPGA made by a different vendor (e.g., without limitation, Xilinx, Inc.). However, a processor made by one vendor (e.g., an 8086 made by Intel®) is not diverse from a plug-compatible, second source processor made by a different vendor (e.g., an 8086 made by AMD®).

As employed herein, the term "vital" means that the acceptable rate of a hazardous event resulting from an abnormal outcome associated with an activity or device is less than about $10^{-9}$/hour (this is a commonly accepted hazardous event rate for vitality). That is, the Mean Time Between Hazardous Events (MTBHE) is greater than $10^9$ hours (approximately 114,000 years). For example, for a train location system to be considered vital, the uncertainty of the position is of such a value that the rate of a hazardous event resulting from a failure of the system due to that uncertainty is less than about $10^{-9}$/hour. Also, it is assumed that static data used by such a vital system, including, for example, track map data, has been validated by a suitably rigorous process under the supervision of suitably responsible parties.

The disclosed concept is described in association with a system and method using Microlok® vital serial communication with an RS-485 interface using a Microlok® Master/Slave protocol, although the disclosed concept is applicable to a wide range of systems and methods to serially transmit vital data through a wide range of communication networks, channels, interfaces or media using a wide range of protocols. For example, serial data communication is a fundamental mechanism to exchange information between two locations over a pair of conductors, or wirelessly. In the railroad industry, for example, serial data communication between controllers can be employed to send commands (e.g., without limitation, a desired train routing; speed information), or to report status (e.g., without limitation, signal and switch positions; track occupancy). Other examples of serial data communication include communicating a track's I.D., direction of travel, the next track circuit's frequency, line and target speed, distance-to-go, coupling and door commands, and switch positions from a controller through a suitable serial data communication interface to a train. Such a serial data communication interface can also send serial messages to the controller to report, for example, identity, health status and track occupancy.

Referring to FIG. 1, a system 2 for serially transmitting vital data includes a first processor 4 structured to determine first data 6, a second processor 8 structured to determine second data 10, a serial communication apparatus 12 structured to input third data 14 and output serial data 16 based upon the third data 14, and a multiple-ported memory 18. The multiple-ported memory 18 includes a first port 20 accessible by the first processor 4, a second port 22 accessible by the second processor 8, a first memory 24 writable by the first processor 4 and readable by the second processor 8, and a second memory 26 writable by the second processor 8 and readable by the first processor 4. The first processor 4 is further structured to store the first data 6 in the first memory 24. The second processor 8 is further structured to store the second data 10 in the second memory 26. Both of the first and second processors 4,6 are further structured to cooperatively agree that the first data 6 in the first memory 24 corresponds to the second data 10 in the second memory 26, and responsively cause the serial communication apparatus 12 to employ: (a) one of the first data 6 and the second data 10 as the third data 14, or (b) part of the first data 6 and part of the second data 10 as the third data 14, and to output the serial data 16 based upon the third data 14.

Example 1

Each of the first processor 4 and the second processor 8 can include a first task 27 structured to determine the first data 6 and the second data 10, respectively, and a second task 28 structured to cooperate with the other one of the first processor 4 and the second processor 8 to cause the serial communication apparatus 12 to input the third data 14 and output the serial data 16 based upon the third data 14.

Example 2

The first processor 4 can be a first vital processor, and the second processor 8 can be a second vital processor which is diverse with respect to the first vital processor.

Example 3

Figure 2:
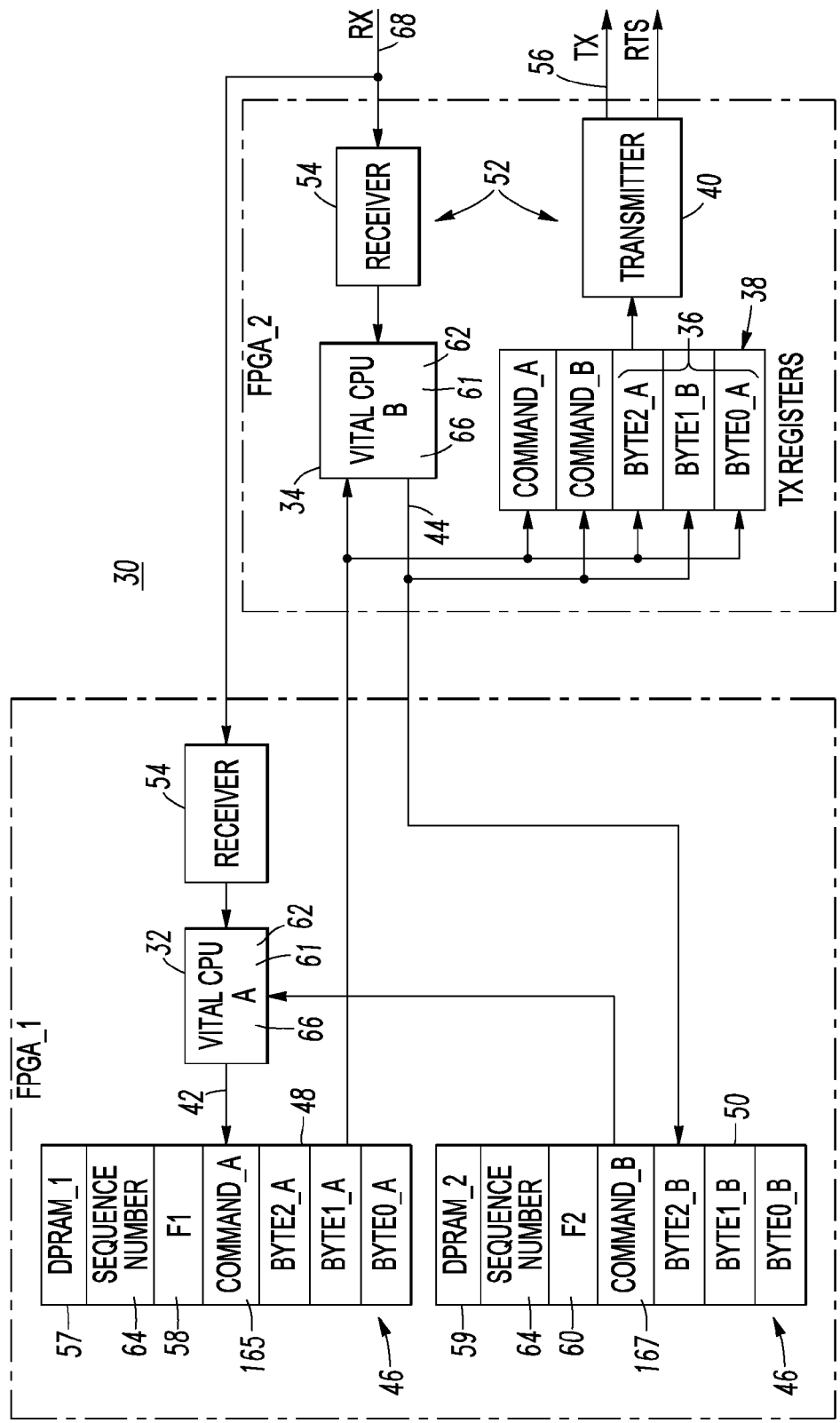
FIG. 2 is a block diagram in schematic form of a vital communication system in accordance with other embodiments of the disclosed concept.

Referring to FIG. 2, an example system 30 for serial transmit communication is disclosed. It will be appreciated that the system 30 can also receive serial communications. In order to vitally transmit a vital serial message, two vital processors 32,34 (e.g., vital CPU A and vital CPU_B) cooperate to form a single message, a portion 36 of which is shown in a set of TX_Registers 38. As will be explained, each of the two vital processors 32,34 is structured to independently corrupt the serial message in order to prevent a valid message with wrong data from being transmitted by serial transmitter 40.

Example 4

The first vital processor 32 can be a first field programmable gate array (e.g., FPGA_1) (e.g., without limitation, marketed by Altera Corporation), and the second vital processor 34 can be a different and diverse second field programmable gate array (e.g., FPGA_2) (e.g., without limitation, marketed by Xilinx, Inc.).

Example 5

Each of first data 42 determined by first vital processor 32 and second data 44 determined by second vital processor 34 can include a message portion and a CRC portion. The message portion can include a header byte, an address byte and a data byte. The CRC portion can include three bytes. The message portion or the CRC portion can be stored in a multiple-ported memory 46 having a first memory 48 (e.g., including example memory locations Byte0_A, Byte1_A, Byte2_A) and a second memory 50 (e.g., including example memory locations Byte0_B, Byte1_B, Byte2_B).

Example 6

In the example shown in FIG. 2, the first processor 32 is a first field programmable gate array (e.g., FPGA_1) including the multiple-ported memory 46, and the second processor 34 is a second field programmable gate array (e.g., FPGA_2) including a serial communication apparatus 52 having the serial transmitter 40 and a serial receiver 54.

Example 7

The first and second processors 32,34 can further be structured to clear the first data 42 in the first memory 48 and the second data 44 in the second memory 50, respectively, if the first data 42 in the first memory 48 does not correspond to (e.g., equal) the second data 44 in the second memory 50.

Example 8

Each of the first data 42 and the second data 44 can include a message portion and a CRC portion. The serial communication apparatus 52 can include a transmit buffer (e.g., the portion 36 of the set of TX_Registers 38) structured in size to receive only one of the message portion and the CRC portion.

Example 9

As will be explained, both of the first and second processors 32,34 can further be structured to cooperatively agree that the first data 42 in the first memory 48 corresponds to the second data 44 in the second memory 50, and responsively cause the serial communication apparatus 52 to output serial data 56 (e.g., shown as TX) based upon the message portion of Example 8. Also, both of the first and second processors 32,34 can further be structured to cooperatively agree that the first data 42 in the first memory 48 corresponds to the second data 44 in the second memory 50, and responsively cause the serial communication apparatus 52 to output the serial data 56 based upon the CRC portion of Example 8.

Example 10

The first and second processors 32,34 can further be structured to clear the first data 42 in the first memory 48 and the second data 44 in the second memory 50, respectively, if the CRC portion of the first data 42 in the first memory 48 does not correspond to the CRC portion of the second data 44 in the second memory 50.

Example 11

The transmit buffer (e.g., the portion 36 of the set of TX_Registers 38) of the serial communication apparatus 52 can be structured to input a first part of the message portion of the first data 42 and a second part of the message portion of the second data 44 before outputting the serial data 56 based upon the first part and the second part. This transmit buffer 36 can further be structured to input a first part of the CRC portion of the first data 42 and a second part of the CRC portion of the second data 44 before outputting the serial data 56 based upon the last such first part and the last such second part.

Example 12

Further to Example 11, each of the first data 42 and the second data 44 can include a message portion and a CRC portion, and the serial communication apparatus transmit buffer (e.g., the portion 36 of the set of TX_Registers 38) can be structured in size (e.g., without limitation, three bytes, as shown) to receive only one of the message portion and the CRC portion.

Example 13

Further to Example 12, the first part of the message portion of the first data 42 can be a number of even bytes (e.g., without limitation, memory locations Byte0_A and Byte2_A, as shown), the second part of the message portion of the second data 44 can be a number of odd bytes (e.g., without limitation, memory location Byte1_B, as shown), the first part of the CRC portion of the first data 42 can be a number of even bytes (e.g., without limitation, memory locations Byte0_A and Byte2_A, as shown), and the second part of the CRC portion of the second data 44 can be a number of odd bytes (e.g., without limitation, memory location Byte1_B, as shown).

Example 14

A portion 57 of the first memory 48 writable by the first processor 32 and readable by the second processor 34 includes a number of first flags 58 (F1) writable by the first processor 32 and readable by the second processor 34. A portion 59 of the second memory 50 writable by the second processor 34 and readable by the first processor 32 includes a number of second flags 60 (F2) writable by the second processor 34 and readable by the first processor 32.

As will be explained, the example flags 58,60 are non-message bytes used to flag the opposite one of the vital processors 32,34 of the state of the data or its processing or transfer. The flags include, for example and without limitation: a "Clear Flag", an "Error Flag", a "Data Written Flag", a "Data Verified Flag", a "Data Transferred Flag", a "CRC Written Flag", and a "CRC Verified Flag".

Example 15

To facilitate the safe transmission of the vital serial data 56, the system 30 provides an example dual-port random access memory (DPRAM) interface to the example transmit buffer (e.g., the portion 36 of the set of TX_Registers 38), the size (e.g., without limitation, three bytes) of which is smaller than the size (e.g., without limitation, six bytes) of the total transmit message (e.g., without limitation, including the message and CRC portions). Initially, the vital processors 32,34 each provide the message portion to the multiple-ported memory 46 excluding the CRC portion. The vital processors 32,34 can then read what was written by the opposite vital processor. Only when one vital processor (e.g., 34 or 32) agrees with the data written by the opposite vital processor (e.g., 32 or 34) does it command the data to be shifted into the transmit buffer 36, as will be explained.

Then, the vital processors 32,34 provide the CRC portion to the multiple-ported memory 46 and command it to be transmitted, as will be explained. However, if the data does not agree, then the vital processors 32 and/or 34 do not complete the message such that a valid message cannot be assembled by the serial communication apparatus transmitter 40 with incorrect data.

In summary, each of the vital processors 32,34 determines the full serial message including the message portion and the CRC portion. Next, both vital processors 32,34 write the corresponding message portion to the corresponding DPRAM_1, DPRAM_2, and then both vital processors 32,34 read the opposite stored message portion of the opposite vital processor and confirm that the opposite message portion is correct. If the vital processors 32,34 agree on the message portion, then each of the vital processors 32,34 sets a corresponding command (Command_A, Command_B) to transmit the message portion. When both vital processors 32,34 have set the corresponding transmit command, the transmitter 40 sends the message portion. Finally, the previous steps for the message portion are repeated for the CRC portion of the full serial message. If at any point, a vital processor does not agree with the opposite message portion or the opposite CRC portion, then it does not set the corresponding transmit command and corrupts the corresponding CRC portion. This stops the transmission, or if the transmission were to occur, then the combined message portion and CRC portion, as corrupted, do not result in a valid message.

The TX_Registers 38 are loaded by a FPGA_2 hardware function that transfers data to or from the vital processor 34. This moves data from the multiple-ported memory 46 to the transmit buffer 36 such that, for example and without limitation, odd byte(s) only come from the second vital processor 34 (e.g., without limitation, a MicroBlaze™ CPU marketed by Xilinx, Inc.) and even bytes only come from the first vital processor 32 (e.g., without limitation, a Nios® II CPU 16 marketed by Altera Corporation). This assures that both vital processors 32,34 are needed to send a complete serial message.

Each complete transmit message (serial data TX 56) is, for example and without limitation, six bytes long consisting of the message portion (e.g., a header byte, an address byte, a data byte) and the CRC portion composed of three bytes. In this example, all transmitted serial messages (by a slave) occur after a message is received (from a master (not shown)). However, the disclosed system 30 could also be used by the master. The message portion is provided by a first task 61 of the vital processors 32 and 34 as an input to a second task, such as a transmit software module 62, which is executed by the vital processors 32,34, along with a sequence number 64 to indicate when the message data is to be transmitted. The transmit software module 62 determines that it is time to transmit a message when a new sequence number 64 is received, although the sequence number 64 is not part of the data to be transmitted. The transmit software module 62 writes the first three bytes (message portion) of the message into the corresponding first or second memory 48,50 at a suitable predetermined location (e.g., example memory locations Byte0_A, Byte1_A, Byte2_A of first memory 48, or example memory locations Byte0_B, Byte1_B, Byte2_B of second memory 50) and sets a corresponding one of the flags 58,60 to indicate that the data is ready.

Example 16

Further to Example 15, the first task 61 of the first and second vital processors 32,34 can further be structured to store the message portion of the first and second data 42,44 in the respective first and second memory 48,50 and change (e.g., increment) the sequence number 64. Response to this change, the second task 62 of the first and second vital processors 32,34 can further be structured to responsively cooperate with the opposite one of the first and second vital processors 32,34 to cause the serial communication apparatus transmitter 40 to input the data from the transmit buffer 36 output the serial data 56 based thereupon.

In addition to the example transmit software module 62, there can also be an optional receive software module 66 that handles a receive message 68 (RX) from a master apparatus (not shown). For example, there can be bi-directional serial communications with each communicating end being capable of both transmitting and receiving messages. The example serial receivers 54 are not required, but provide an example full serial data link. Receive messages 68 (RX) are simply distributed to both vital processors 32,34, which, in this example, have both transmitting and receiving capabilities.

Example 17

The example vital processors 32,34 can include a cyclic operating system (not shown) in which each main task (e.g., 61,62,66) is executed once each cycle. Alternatively, the optional receive software module 66 can be structured to interrupt the corresponding vital processor 32,34 only when data has been received. The first decision made by each task is to determine if it needs to run. The example transmit software module 62 runs if there is new data to transmit or if data was transmitted on the previous cycle.

If new data is ready to be transmitted, the example message data processing software (e.g., task 61) places the complete example 6-byte transmit message, which includes the example message portion (e.g., a header byte, an address byte, and a data byte) and the example CRC portion (e.g., a 3-byte CRC) into a suitable portion of the corresponding first and second memory 48,50, and increments the sequence number 64. This change in the sequence number 64 notifies the transmit software module 62 that new data is ready to be transmitted. The sequence number 64 is not part of the data that will be transmitted; it is used only to inform the transmit software module 62 that new data is ready.

In response to the change in the sequence number 64, the transmit software module 62 writes the message portion into the corresponding portion (e.g., example memory locations Byte0_A, Byte1_A, Byte2_A of first memory 48, or example memory locations Byte0_B, Byte1_B, Byte2_B of second memory 50) of the corresponding first and second memory 48,50. It then sets a corresponding one of the corresponding flags 58,60 to indicate that the first message portion of the data is ready to be checked.

The transmit software module 62 remains in the same software cycle, checking a corresponding one of the flags 60,58 of the opposite vital processor 34,32 to determine when the message portion bytes are ready to be checked. After the set corresponding flag is detected, the transmit software module 62 reads and verifies the message portion of the opposite vital processor 34,32. If the read message portion is correct, then the transmit software module 62 (of vital processor 34 or 32) writes a command (Command_B or Command_A) to transfer the message portion to the transmit buffer 36. After the transmitter 40 receives the commands (Command_A and Command_B) from both processors 32,34, it transfers the message portion and begins serial transmission thereof.

The transmit software module 62 also sets another one of the corresponding flags 58,60 to indicate that it has approved the message portion and commanded a serial transmission. After commanding the message portion, each transmit software module 62 polls the corresponding flags 60,58 waiting for the opposite transmit software module 62 to indicate that it has commanded the transmitter 40 to transmit the transmit buffer 36. After this flag is detected, the transmit software module 62 clears the corresponding portion (e.g., example memory locations Byte0_A, Byte1_A, Byte2_A of first memory 48, or example memory locations Byte0_B, Byte1_B, Byte2_B of second memory 50) of the corresponding first and second memory 48,50 and writes the CRC portion thereto.

The transmit software module 62 then processes the CRC portion of the message in a like manner. First, it sets another one of the corresponding flags 58,60 to indicate that the CRC portion of the message is ready for the opposite transmit software module 62 to verify the same. After polling for the corresponding one of the flags 60,58 to be set by the opposite transmit software module 62, the present transmit software module 62 reads and verifies the CRC portion of the opposite transmit software module 62. When the CRC portions compare correctly, then the transmit software module 62 (of vital processor 34 or 32) writes the command (Command_B or Command_A) to transfer the CRC portion to the transmit buffer 36.

When any of the checks of the opposite message portion or the opposite CRC portion do not compare correctly or if polling for one of the flags 58,60 times out, then the transmit software module 62 clears the corresponding one of the first and second memories 48,50 and does not send any commands to transfer a message to the transmitter 40. The transmit software module 62 sets another one of the corresponding flags 58,60 indicating a failure and sets a fault indicator (not shown) as an output thereof.

During the write process, when polling for any of the corresponding flags 58,60, the transmit software module 62 also checks for a failure flag as an indicator to end the write process, clear the data in the corresponding one of the first and second memories 48,50, and set the fault indicator (not shown). The entire write process is structured to be completed within one software cycle such that the write process is not exited until it is complete with either a success or failure.

On the software cycle after a write is attempted, the transmit software module 62 clears the corresponding one of the first and second memories 48,50 including the corresponding transfer command location 165,167. It also clears all of the corresponding flags 58,60 associated with the write process.

Example 18

The example FPGA_1 and FPGA_2 work with the various software tasks 61,62,66 to handle Microlok® vital serial communication (transmit only) via an example RS-485 interface (not shown) using a Microlok® Master/Slave protocol (not shown). The example FPGA_1 and FPGA_2 include the vital processors 32,34, other non-CPU programmable hardware logic (PHW) which forms, for example, the transmitter 40, the TX_Registers 38, the receiver 54, and the multiple-ported memory 46.

An example vital communication message is a six-byte message, which includes message and CRC portions, as were discussed above. The serial communication apparatus 52 treats the example three-byte message portion and the example three-byte CRC portion in the same manner, such that the term "three-byte data" is used to represent either message portion or message CRC portion.

The example first and second memories 48,50 (DPRAM_1 and DPRAM_2) allow data to be exchanged between the first vital processor 32 and the second vital processor 34. The first memory 48 (DPRAM_1) stores data written by the first vital processor 32, which is read by the second vital processor 34. The second memory 50 (DPRAM_2) stores data written by second vital processor 34, which is read by the first vital processor 32.

The example transmitter 40 is implemented in the example second FPGA_2 only, since the transmission RS-485 UART (not shown) is connected with the second FPGA_2 only. In the disclosed system 30, the system 30 is a slave unit and a MICROLOK® II Vital Interlocking Controller (not shown) is a master unit. In the corresponding Microlok® Master/Slave protocol, the master starts a communications cycle by transmitting a message 68 (RX) to a slave. The slave processes the message data and formats and transmits its response 56 (TX) to the master.

The first vital processor 32 writes its three-byte message portion to the first memory 48 (DPRAM_1) and the second vital processor 34 writes its three-byte message portion to the second memory 50 (DPRAM_2). Both vital processors 32,34 then perform crosschecking by reading the opposite vital processor memory. If the first vital processor 32 is in agreement with the three-byte message portion written by the second vital processor 34, the first vital processor 32 will write a one-byte command 165 (Command_A) to the first memory 48 (DPRAM_1) indicating the message portion is verified by the first vital processor 32. If the second vital processor 34 is in agreement with the three-byte message portion written by the first vital processor 32, the second vital processor 34 will write a one-byte command 167 (Command_B) to the second memory 50 (DPRAM_2) indicating the message portion is verified by the second vital processor 34. Upon receiving both commands 165,167 (Command_A and Command_B) from the two vital processors 32,34, the transmitter 40 loads an output shift register (not shown) with the data bytes of the message portion and begins shifting them out.

The two memories 48,50 are employed in conjunction with the TX_Registers 38. The two even bytes of data (Byte0_A, Byte2_A) and one-byte command 165 (Command_A) in the TX_Registers 38 are synchronized with the first memory 48 (DPRAM_1) when the second vital processor 34 reads the first three-byte message portion or one-byte command 165 from the first memory 48 (DPRAM_1). The one odd byte of data (Byte1_B) and one-byte command 167 (Command_B) in the TX_Registers 38 are synchronized with the second memory 50 (DPRAM_2) when the second vital processor 34 writes its own three-byte message portion and one-byte command 167 to the second memory 50 (DPRAM_2).

The transmitter 40 transmits the serial data 56 starting with the least significant bit when both Command_A and Command_B of the TX_Registers 38 show valid send commands. The transmitter 40 loads the transmit shift register (not shown) upon a transition of both of the two command bytes becoming valid. The valid command written by the first vital processor 32 is defined, for example and without limitation, as being "A5" in Hex format or A5H. The valid command written by the second vital processor 34 is defined, for example and without limitation, as being C3H. The disclosed interface allows for the transmit software module 62 to command the transmitter 40 to begin shifting data out while immediately loading the next three bytes of the CRC portion without regard to when the command byte 165,167 is cleared. The command byte 165,167 needs to be cleared (or made invalid) and the valid command needs to be re-written before the transmitter 40 will reload more data.

The multiple-ported memory 46 is configured such that when the second vital processor 34 writes to the second memory 50 (DPRAM_2) it is also writing to the TX_Registers 38. When the second vital processor 34 reads the first memory 48 (DPRAM_1), data is also transferred to the TX_Registers 38. When both vital processors 32,34 agree on the data and set their respective commands 165,167, the second vital processor 34 reads the first vital processor command 165 to transfer the command to the TX_Registers 38. The second vital processor 34 is not checking the command status, which command could be a command to transmit or not-transmit. The above read by the second vital processor 34 is employed because the independent first vital processor 32 of the example embodiment does not directly write to the TX_Registers 38 of the example FPGA_2.

Example 19

Figure 6:
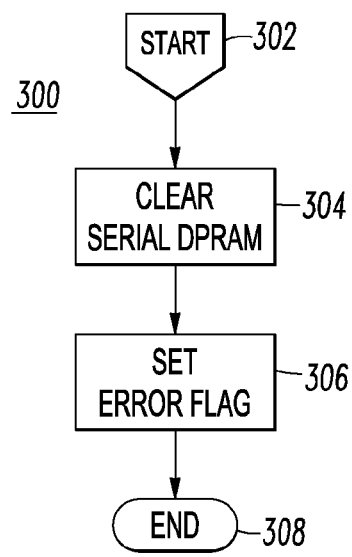
FIGS. 3-6 are software flowcharts executed by the vital processors of FIG. 2.

FIGS. 3-6 show flowcharts of the transmit software module 62 employed to execute the functions to transmit a serial message from the two vital processors 32,34. The transmit software module 62 includes a main routine 100 (FIGS. 3-5) and an error routine 300 (FIG. 6).

After starting at 102, the routine 100 determines if a transmission (Tx) is required at 104. In the example system 30 of FIG. 2, transmissions are only done in response to a received message (RX) 68, so they are not required every cycle. Step 104 checks whether a transmission is required this cycle. If not, then at 106, it is determined if the last cycle required a transmission. The cycle after a transmission is used to clean up old data from the last transmitted message. Step 106 determines if such a clean up is required. If so, then at 108, the corresponding memory 48 or 50 (DPRAM_1 or DPRAM_2) is cleared including the corresponding flags 58 or 60. If not, or after 108, the routine 100 ends at 110.

On the other hand, if a transmission is required at 104, then at 112, it is determined if the corresponding memory 48 or 50 (DPRAM_1 or DPRAM_2) including the corresponding flags 58 or 60 is clear. If not, then at 114, the error routine 300 of FIG. 6 is executed. Otherwise, if the corresponding memory 48 or 50 is clear, then at 116, the "Clear Flag" of the corresponding flags 58 or 60 is set, after which the flags 60 or 58 of the opposite vital processor 34 or 32 are polled at 118.

Next, at 122, it is determined if the "Clear Flag" of the opposite vital processor 34 or 32 is set. If not, then 124 and 126 sequentially determine if an "Error Flag" of the opposite processor is set or if a suitable predetermined time (e.g., without limitation, 7 mS; any suitable time; a sufficient time since two processors (e.g., without limitation, running a 20 mS main cycle time loop) could be slightly out of synchronization) for polling the opposite flags has expired. Each vital processor 32,34 waits for like operations on the opposite vital processor to be completed before proceeding. If the opposite vital processor does not complete its operation or set its "Error Flag", then an internal timer (not shown) is used to break an otherwise endless loop of waiting for flags to be set. If the timer has expired at 126 or if the opposite "Error Flag" is set at 124, then at 130, the error routine 300 of FIG. 6 is executed. Otherwise, if the flag polling time has not expired, then step 118 is repeated. On the other hand, if the "Clear Flag" of the opposite vital processor 34 or 32 is set at 122, then at 132, the message portion of the message is written to the corresponding memory 48 or 50 (DPRAM_1 or DPRAM_2) at 132 and the "Data Written Flag" of the corresponding flags 58 or 60 is set at 134.

After 134, the flags 60 or 58 of the opposite vital processor 34 or 32 are polled at 136. Next, at 138, it is determined if the "Data Written Flag" of the opposite vital processor 34 or 32 is set. If not, then 140 and 142 sequentially determine if the "Error Flag" of the opposite processor is set or if a suitable predetermined time (e.g., without limitation, 500 µS; any suitable time; a smaller time than step 126 since that wait has the effect of synchronizing the processors 32,34) for polling the opposite flags has expired. If so at 140 or 142, then at 144, the error routine 300 of FIG. 6 is executed. Otherwise, if the flag polling time has not expired, then step 136 is repeated. On the other hand, if the "Data Written Flag" of the opposite vital processor 34 or 32 is set at 138, then at 146, the message portion of the message is read from the opposite memory 50 or 48 (DPRAM_2 or DPRAM_1) at 146.

Figure 3:
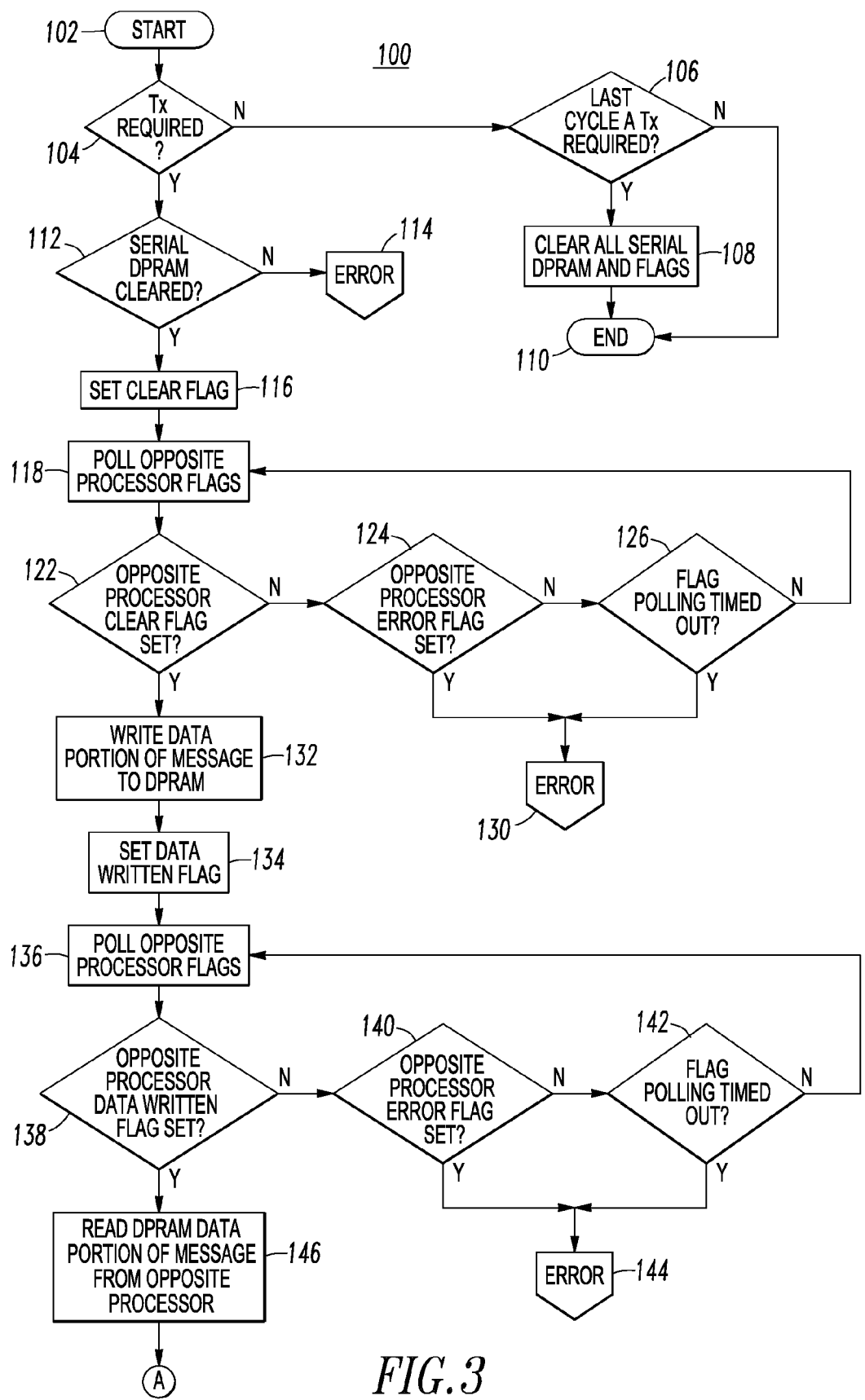
Figure 4:
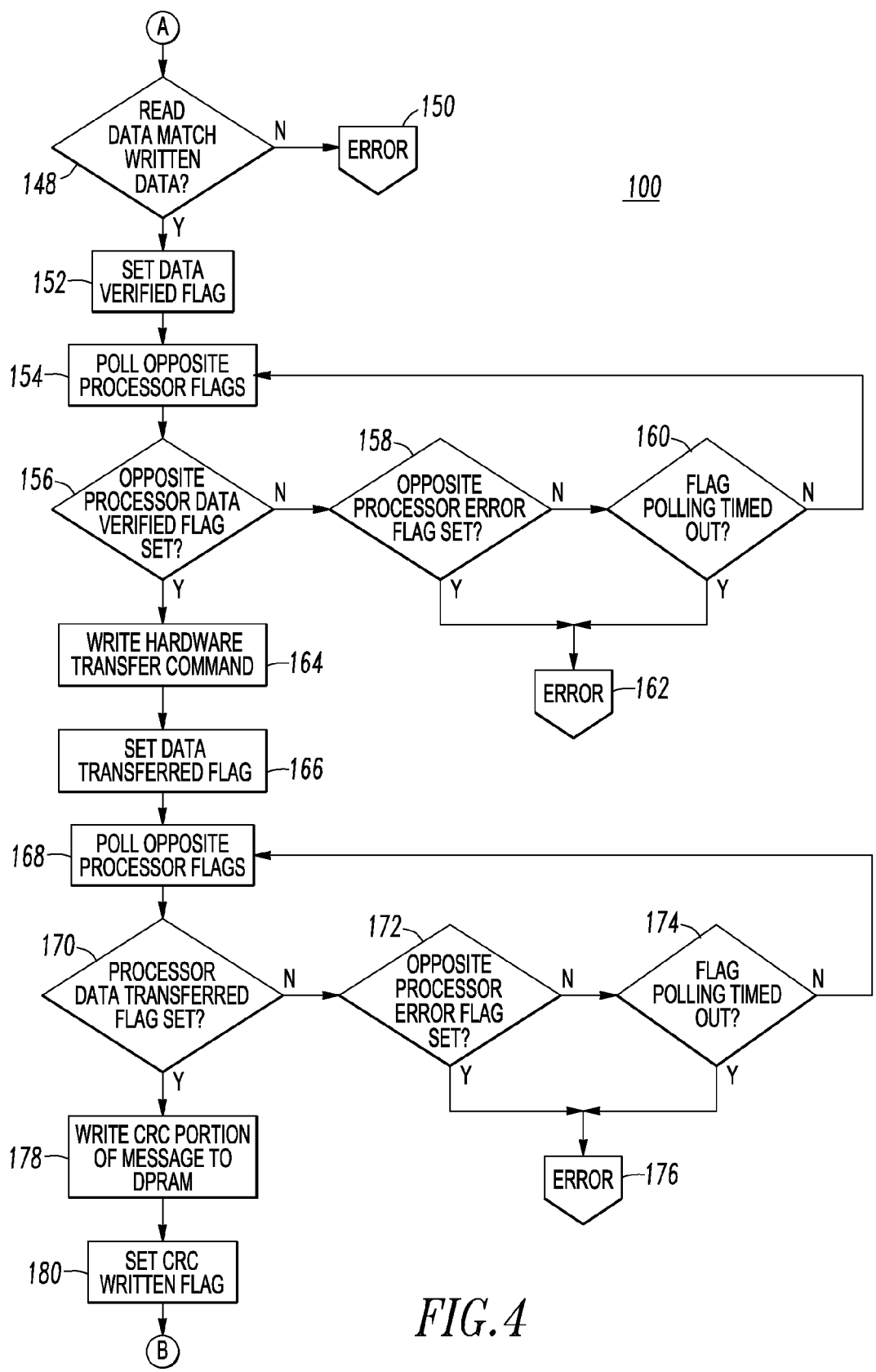

Next, at 148 of FIG. 4, it is determined if the data read from step 146 matches the data written at step 132 of FIG. 3. If not, then at 150, the error routine 300 of FIG. 6 is executed. Otherwise, the "Data Verified Flag" of the corresponding flags 58 or 60 is set at 152. After 152, the flags 60 or 58 of the opposite vital processor 34 or 32 are polled at 154. Next, at 156, it is determined if the "Data Verified Flag" of the opposite vital processor 34 or 32 is set. If not, then 158 and 160 sequentially determine if the "Error Flag" of the opposite processor is set or if the suitable predetermined time of step 142 for polling the opposite flags has expired. If so at 158 or 160, then at 162, the error routine 300 of FIG. 6 is executed. Otherwise, if the flag polling time has not expired, then step 154 is repeated. On the other hand, if the "Data Verified Flag" of the opposite vital processor 34 or 32 is set at 156, then at 164, the "Write Hardware Transfer Command" 165 or 167 (Command_A or Command_B) is set in the corresponding memory 48 or 50 (DPRAM_1 or DPRAM_2) and the "Data Transferred Flag" of the corresponding flags 58 or 60 is set at 166. Hence, in response to the two "Data Verified Flags", as set at 152 and checked at 156, the commands 165,167 cause the transmitter 40 to output the message portion of the serial data (TX) 56.

After 166, the flags 60 or 58 of the opposite vital processor 34 or 32 are polled at 168. Next, at 170, it is determined if the "Data Transferred Flag" of the opposite vital processor 34 or 32 is set. If not, then 172 and 174 sequentially determine if the "Error Flag" of the opposite processor is set or if the suitable predetermined time of step 142 for polling the opposite flags has expired. If so, then at 176, the error routine 300 of FIG. 6 is executed. Otherwise, if the flag polling time has not expired, then step 168 is repeated. On the other hand, if the "Data Transferred Flag" of the opposite vital processor 34 or 32 is set at 170, then at 178, the CRC portion of the message is written to the corresponding memory 48 or 50 (DPRAM_1 or DPRAM_2) at 178 and the "CRC Written Flag" of the corresponding flags 58 or 60 is set at 180.

Figure 5:
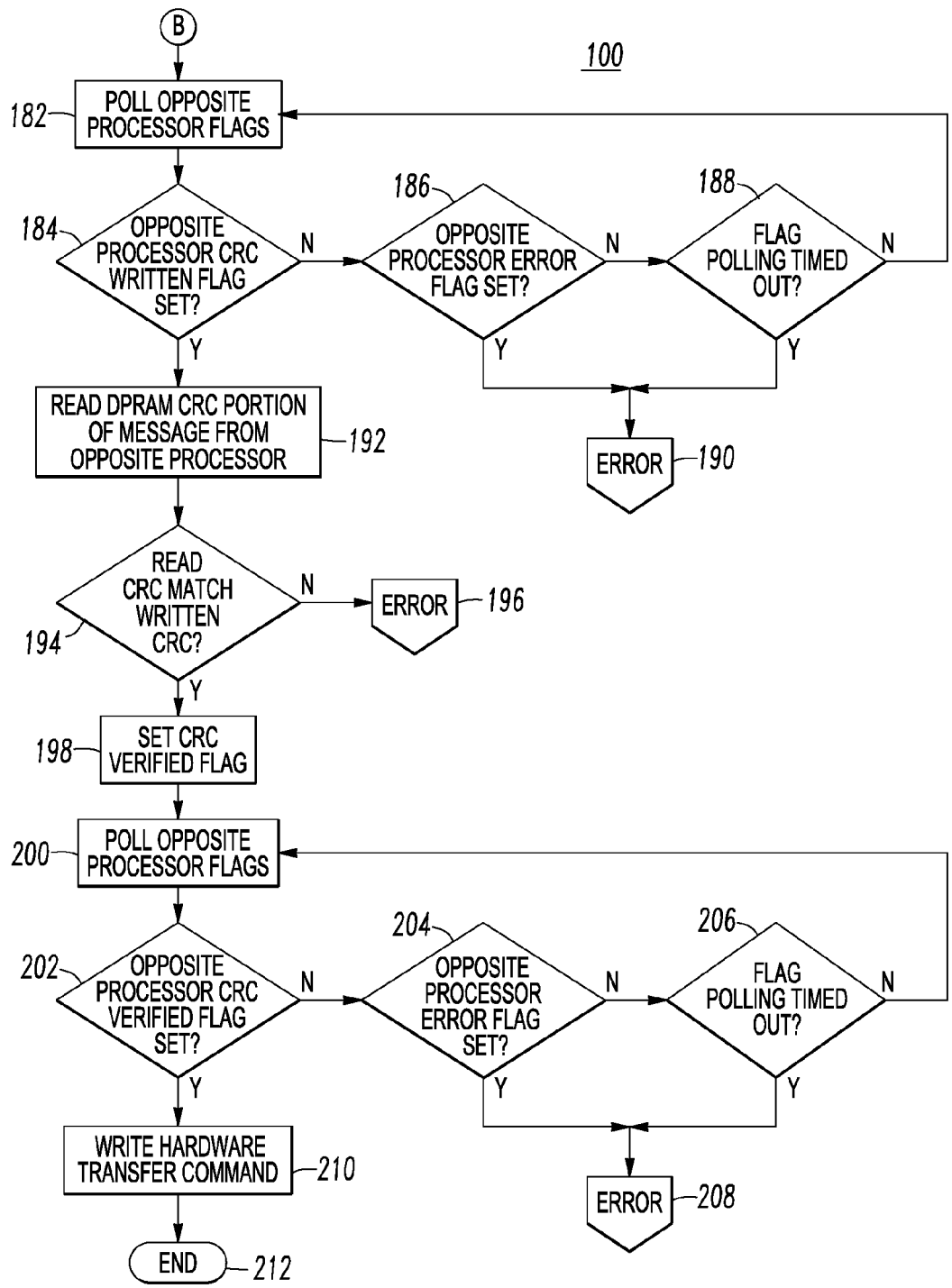

After 180, the flags 60 or 58 of the opposite vital processor 34 or 32 are polled at 182 of FIG. 5. Next, at 184, it is determined if the "CRC Written Flag" of the opposite vital processor 34 or 32 is set. If not, then 186 and 188 sequentially determine if the "Error Flag" of the opposite processor is set or if the suitable predetermined time of step 142 for polling the opposite flags has expired. If so at 186 or 188, then at 190, the error routine 300 of FIG. 6 is executed. Otherwise, if the flag polling time has not expired, then step 182 is repeated. On the other hand, if the "CRC Written Flag" of the opposite vital processor 34 or 32 is set at 184, then at 192, the CRC portion of the message is read from the opposite memory 50 or 48 (DPRAM_2 or DPRAM_1) at 192.

Next, at 194, it is determined if the CRC read from step 192 matches the CRC written at step 178 of FIG. 4. If not, then at 196, the error routine 300 of FIG. 6 is executed. Otherwise, the "CRC Verified Flag" of the corresponding flags 58 or 60 is set at 198. After 198, the flags 60 or 58 of the opposite vital processor 34 or 32 are polled at 200. Next, at 202, it is determined if the "CRC Verified Flag" of the opposite vital processor 34 or 32 is set. If not, then 204 and 206 sequentially determine if the "Error Flag" of the opposite processor is set or if the suitable predetermined time of step 142 for polling the opposite flags has expired. If so at 204 or 206, then at 208, the error routine 300 of FIG. 6 is executed. Otherwise, if the flag polling time has not expired, then step 200 is repeated. On the other hand, if the "CRC Verified Flag" of the opposite vital processor 34 or 32 is set at 202, then at 210, the "Write Hardware Transfer Command" 165 or 167 (Command_A or Command_B) is set in the corresponding memory 48 or 50 (DPRAM_1 or DPRAM_2), after which the routine 100 ends at 212. Hence, in response to the two "CRC Verified Flags", as set at 198 and checked at 202, the commands 165,167 cause the transmitter 40 to output the CRC portion of the serial data (TX) 56.

FIG. 6 shows the error routine 300. After starting at 302, the corresponding memory 48 or 50 (DPRAM_1 or DPRAM_2) is cleared at 304 including the corresponding flags 58 or 60. Next, at 306, the "Error Flag" of the corresponding flags 58 or 60 is set. Finally, at 308, the error routine 300 ends, which also ends the routine 100.

Example 20

Although FIG. 2 shows the TX_Registers 38 in which parts of the message portion or the CRC portion are taken from both of the first memory 48 and from the second memory 50/second vital processor 34, the TX_Registers 38 and/or the transmitter 40 could alternatively receive the message portion or the CRC portion from one of the first memory 48 and the second memory 50/second vital processor 34. As a non-limiting example, the message portion or the CRC portion could be taken solely from the second memory 50/second vital processor 34, with the Command_A being from the first memory 48 (e.g., on a read thereof by the second vital processor 34).

However, preferably, no single vital processor 32,34 is permitted to format the full CRC portion. Instead, each vital processor 32,34 preferably has the ability to corrupt the CRC portion if it disagrees with the data content written by the opposite vital processor.

As another alternative, the Command_A could be directly written from the first vital processor 32 to the TX_Registers 38 and/or the transmitter 40.

The disclosed sequence number 64 and the limited size of the transmit buffer 36 with respect to the size of the transmit message/serial data 56 provide a suitable mechanism of stalled data protection. For example, the sequence number 64 ensures that old or stale data is not resent in error by the transmitter 40. Also, the limited size of the transmit buffer 36, which can contain only the message portion or the CRC portion of the transmit message, ensures that the transmit buffer 36, alone, cannot form a valid transmit message.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A system for serially transmitting vital data, said system comprising:
   a first processor structured to determine first data;
   a second processor structured to determine second data;
   a serial communication apparatus structured to input third data and output serial data based upon said third data; and
   a multiple-ported memory comprising a first port accessible by said first processor, a second port accessible by said second processor, a first memory writable by said first processor and readable by said second processor, and a second memory writable by said second processor and readable by said first processor,
   wherein said first processor is further structured to store said first data in said first memory,
   wherein said second processor is further structured to store said second data in said second memory, and
   wherein both of said first and second processors are further structured to cooperatively agree that said first data in said first memory corresponds to said second data in said second memory, and responsively cause said serial communication apparatus to employ part of said first data and part of said second data as said third data, and to serially output said serial data including said third data to a location different than a location of said first and second processors.

2. The system of claim 1 wherein said serial communication apparatus is further structured to directly input said third data from said multiple-ported memory.

3. A system for serially transmitting vital data, said system comprising:
- a first processor structured to determine first data;
- a second processor structured to determine second data;
- a serial communication apparatus structured to input third data and output serial data based upon said third data; and
- a multiple-ported memory comprising a first port accessible by said first processor, a second port accessible by said second processor, a first memory writable by said first processor and readable by said second processor, and a second memory writable by said second processor and readable by said first processor,
- wherein said first processor is further structured to store said first data in said first memory,
- wherein said second processor is further structured to store said second data in said second memory,
- wherein both of said first and second processors are further structured to cooperatively agree that said first data in said first memory corresponds to said second data in said second memory, and responsively cause said serial communication apparatus to employ: (a) one of said first data and said second data as said third data, or (b) part of said first data and part of said second data as said third data, and to output said serial data based upon said third data, and
- wherein said first and second processors are further structured to clear said first data in said first memory and said second data in said second memory, respectively, if said first data in said first memory does not correspond to said second data in said second memory.

4. The system of claim 3 wherein each of said first data and said second data comprises a message portion and a CRC portion; and wherein said serial communication apparatus comprises a buffer structured in size to receive only one of said message portion and said CRC portion.

5. The system of claim 4 wherein both of said first and second processors are further structured to cooperatively agree that said first data in said first memory corresponds to said second data in said second memory, and responsively cause said serial communication apparatus to output said serial data based upon said message portion; and wherein both of said first and second processors are further structured to cooperatively agree that said first data in said first memory corresponds to said second data in said second memory, and responsively cause said serial communication apparatus to output said serial data based upon said CRC portion.

6. The system of claim 5 wherein said first and second processors are further structured to clear said first data in said first memory and said second data in said second memory, respectively, if the CRC portion of said first data in said first memory does not correspond to the CRC portion of said second data in said second memory.

7. The system of claim 4 wherein the buffer of said serial communication apparatus is structured to input a first part of the message portion of said first data and a second part of the message portion of said second data before outputting said serial data based upon said first part and said second part, and is further structured to input a first part of the CRC portion of said first data and a second part of the CRC portion of said second data before outputting said serial data based upon the last said first part and the last said second part.

8. The system of claim 7 wherein the first part of the message portion of said first data is a number of even bytes; wherein the second part of the message portion of said second data is a number of odd bytes; wherein the first part of the CRC portion of said first data is a number of even bytes; and wherein the second part of the CRC portion of said second data is a number of odd bytes.

9. A system for serially transmitting vital data, said system comprising:
- a first processor structured to determine first data;
- a second processor structured to determine second data;
- a serial communication apparatus structured to input third data and output serial data based upon said third data; and
- a multiple-ported memory comprising a first port accessible by said first processor, a second port accessible by said second processor, a first memory writable by said first processor and readable by said second processor, and a second memory writable by said second processor and readable by said first processor,
- wherein said first processor is further structured to store said first data in said first memory,
- wherein said second processor is further structured to store said second data in said second memory,
- wherein both of said first and second processors are further structured to cooperatively agree that said first data in said first memory corresponds to said second data in said second memory, and responsively cause said serial communication apparatus to employ: (a) one of said first data and said second data as said third data, or (b) part of said first data and part of said second data as said third data, and to output said serial data based upon said third data,
- wherein a portion of the first memory writable by said first processor and readable by said second processor includes a number of first flags writable by said first processor and readable by said second processor; and wherein a portion of the second memory writable by said second processor and readable by said first processor includes a number of second flags writable by said second processor and readable by said first processor.

10. The system of claim 9 wherein one of said first and second processors is further structured to determine whether one of said number of first flags and said number of second flags is not set by the other one of said first and second processors in a predetermined time, and responsively clear said first data in said first memory and said second data in said second memory, respectively.

11. The system of claim 9 wherein said serial communication apparatus is further structured, in response to one of said number of first flags and one of said number of second flags, to output said serial data based upon said third data.

12. The system of claim 9 wherein both of said first and second processors are further structured to set one of said number of first flags and one of said number of second flags, respectively, when said first data in said first memory corresponds to said second data in said second memory; and wherein both of said first and second processors are further structured to set another one of said number of first flags and another one of said number of second flags, respectively, to responsively cause said serial communication apparatus to output said serial data based upon said third data.

13. The system of claim 9 wherein said number of first flags and said number of second flags are selected from the group consisting of a third flag indicating that said first data in said first memory or said second data in said second memory is clear, a fourth flag indicating an error, a fifth flag indicating that said first data was written to said first memory or said second data was written to said second memory, a sixth flag indicating that said first data in said first memory was verified with said second data in said second memory, and a seventh flag indicating that said serial communication apparatus should output said serial data based upon said third data.

14. The system of claim 13 wherein one of said first processor and said second processor is further structured to determine that the third flag of the other one of said first processor and said second processor is set, responsively store said first data in said first memory or said second data in said second memory, respectively, and set said fifth flag.

15. The system of claim 14 wherein responsive to said set said fifth flag, said one of said first processor and said second processor is further structured to verify that said first data in said first memory corresponds to said second data in said second memory and responsively set said sixth flag.

16. The system of claim 15 wherein responsive to said set said sixth flag, said one of said first processor and said second processor is further structured to determine that the sixth flag of the other one of said first processor and said second processor is set, and responsively set said seventh flag.

17. The system of claim 16 wherein responsive to said set said seventh flag, said one of said first processor and said second processor is further structured to command said serial communication apparatus to input said third data and output said serial data based upon said third data.

18. The system of claim 17 wherein said one of said first processor and said second processor is further structured to determine that the seventh flag of the other one of said first processor and said second processor is set, and responsively clear said first data in said first memory or said second data in said second memory, and then set said third flag.

19. A system for serially transmitting vital data, said system comprising:
   a first processor structured to determine first data;
   a second processor structured to determine second data;
   a serial communication apparatus structured to input third data and output serial data based upon said third data; and
   a multiple-ported memory comprising a first port accessible by said first processor, a second port accessible by said second processor, a first memory writable by said first processor and readable by said second processor, and a second memory writable by said second processor and readable by said first processor,
   wherein said first processor is further structured to store said first data in said first memory,
   wherein said second processor is further structured to store said second data in said second memory,
   wherein both of said first and second processors are further structured to cooperatively agree that said first data in said first memory corresponds to said second data in said second memory, and responsively cause said serial communication apparatus to employ: (a) one of said first data and said second data as said third data, or (b) part of said first data and part of said second data as said third data, and to output said serial data based upon said third data, and
   wherein both of said first and second processors are structured to cause said serial communication apparatus to input part of said first data and part of said second data as said third data.

20. The system of claim 19 wherein each of said first data and said second data comprises a message portion and a CRC portion; and wherein said serial communication apparatus comprises a buffer structured in size to receive only one of said message portion and said CRC portion.

21. The system of claim 19 wherein said first processor is a first vital processor; and wherein said second processor is a second vital processor which is diverse with respect to said first vital processor.

22. The system of claim 21 wherein said first vital processor is a first field programmable gate array; and wherein said second vital processor is a different and diverse second field programmable gate array.

23. The system of claim 19 wherein each of said first data and said second data comprises a message portion and a CRC portion; wherein said message portion comprises a header byte, an address byte and a data byte; and wherein said CRC portion comprises three bytes.

24. The system of claim 19 wherein said first processor is a first field programmable gate array including said multiple-ported memory; and wherein said second processor is a second field programmable gate array including said serial communication apparatus.

25. A system for serially transmitting vital data, said system comprising:
   a first processor structured to determine first data;
   a second processor structured to determine second data;
   a serial communication apparatus structured to input third data and output serial data based upon said third data; and
   a multiple-ported memory comprising a first port accessible by said first processor, a second port accessible by said second processor, a first memory writable by said first processor and readable by said second processor, and a second memory writable by said second processor and readable by said first processor,
   wherein said first processor is further structured to store said first data in said first memory,
   wherein said second processor is further structured to store said second data in said second memory,
   wherein both of said first and second processors are further structured to cooperatively agree that said first data in said first memory corresponds to said second data in said second memory, and responsively cause said serial communication apparatus to employ part of said first data and part of said second data as said third data, and to serially output said serial data including said third data to a location different than a location of said first and second processors, and
   wherein each of said first processor and said second processor comprises a first task structured to determine said first data and said second data, respectively, and a second task structured to cooperate with the other one of said first processor and said second processor to cause said serial communication apparatus to input said third data and output said serial data based upon said third data.

26. The system of claim 25 wherein said serial communication apparatus is further structured to directly input said third data from said multiple-ported memory.

27. A system for serially transmitting vital data, said system comprising:
   a first processor structured to determine first data;
   a second processor structured to determine second data;
   a serial communication apparatus structured to input third data and output serial data based upon said third data; and
   a multiple-ported memory comprising a first port accessible by said first processor, a second port accessible by said second processor, a first memory writable by said first processor and readable by said second processor, and a second memory writable by said second processor and readable by said first processor,
   wherein said first processor is further structured to store said first data in said first memory,
   wherein said second processor is further structured to store said second data in said second memory, wherein both of said first and second processors are further structured to cooperatively agree that said first data in said first memory corresponds to said second data in said second memory, and responsively cause said serial communication apparatus to employ: (a) one of said first data and said second data as said third data, or (b) part of said first data and part of said second data as said third data, and to output said serial data based upon said third data, wherein each of said first processor and said second processor comprises a first task structured to determine said first data and said second data, respectively, and a second task structured to cooperate with the other one of said first processor and said second processor to cause said serial communication apparatus to input said third data and output said serial data based upon said third data, wherein said first memory further comprises a sequence number; wherein the first task of said first processor is further structured to store said first data in said first memory and increment said sequence number; and wherein said second task of said first processor is further structured to responsively cooperate with said second processor to cause said serial communication apparatus to input said third data and output said serial data based upon said third data.

28. A system for serially transmitting vital data, said system comprising:

a first processor structured to determine first data;

a second processor structured to determine second data;

a serial communication apparatus structured to input third data and output serial data based upon said third data; and a multiple-ported memory comprising a first port accessible by said first processor, a second port accessible by said second processor, a first memory writable by said first processor and readable by said second processor, and a second memory writable by said second processor and readable by said first processor, wherein said first processor is further structured to store said first data in said first memory, wherein said second processor is further structured to store said second data in said second memory, wherein both of said first and second processors are further structured to cooperatively agree that said first data in said first memory corresponds to said second data in said second memory, and responsively cause said serial communication apparatus to employ: (a) one of said first data and said second data as said third data, or (b) part of said first data and part of said second data as said third data, and to output said serial data based upon said third data, wherein each of said first processor and said second processor comprises a first task structured to determine said first data and said second data, respectively, and a second task structured to cooperate with the other one of said first processor and said second processor to cause said serial communication apparatus to input said third data and output said serial data based upon said third data, and wherein both of said first and second processors are structured to cause said serial communication apparatus to input part of said first data and part of said second data as said third data.

29. A method of serially transmitting vital data, said method comprising:

determining first data with a first processor;

determining second data with a second processor;

inputting third data with a serial communication apparatus;

outputting serial data with said serial communication apparatus based upon said third data;

accessing a first port of a multiple-ported memory by said first processor;

accessing a second port of said multiple-ported memory by said second processor;

writing a first memory of said multiple-ported memory by said first processor;

reading said first memory of said multiple-ported memory by said second processor;

writing a second memory of said multiple-ported memory by said second processor;

reading said second memory of said multiple-ported memory by said first processor;

storing said first data in said first memory by said first processor;

storing said second data in said second memory by said second processor;

agreeing by both of said first and second processors that said first data in said first memory corresponds to said second data in said second memory; and responsive to said agreeing, causing said serial communication apparatus to employ part of said first data and part of said second data as said third data, and to serially output said serial data including said third data to a location different than a location of said first and second processors.

30. The method of claim 29 further comprising:

directly inputting said third data by said serial communication apparatus from said multiple-ported memory.

31. A method of serially transmitting vital data, said method comprising:

determining first data with a first processor;

determining second data with a second processor;

inputting third data with a serial communication apparatus;

outputting serial data with said serial communication apparatus based upon said third data;

accessing a first port of a multiple-ported memory by said first processor;

accessing a second port of said multiple-ported memory by said second processor;

writing a first memory of said multiple-ported memory by said first processor;

reading said first memory of said multiple-ported memory by said second processor;

writing a second memory of said multiple-ported memory by said second processor;

reading said second memory of said multiple-ported memory by said first processor;

storing said first data in said first memory by said first processor;

storing said second data in said second memory by said second processor;

agreeing by both of said first and second processors that said first data in said first memory corresponds to said second data in said second memory;

responsive to said agreeing, causing said serial communication apparatus to employ: (a) one of said first data and said second data as said third data, or (b) part of said first data and part of said second data as said third data, and to output said serial data based upon said third data; and causing, by both of said first and second processors, said serial communication apparatus to input part of said first data and part of said second data as said third data.

* * * * *